Oct. 9, 1934.　　　F. LEE ET AL　　　1,976,618
DUPLICATING MACHINE
Filed Sept. 11, 1929　　10 Sheets-Sheet 3

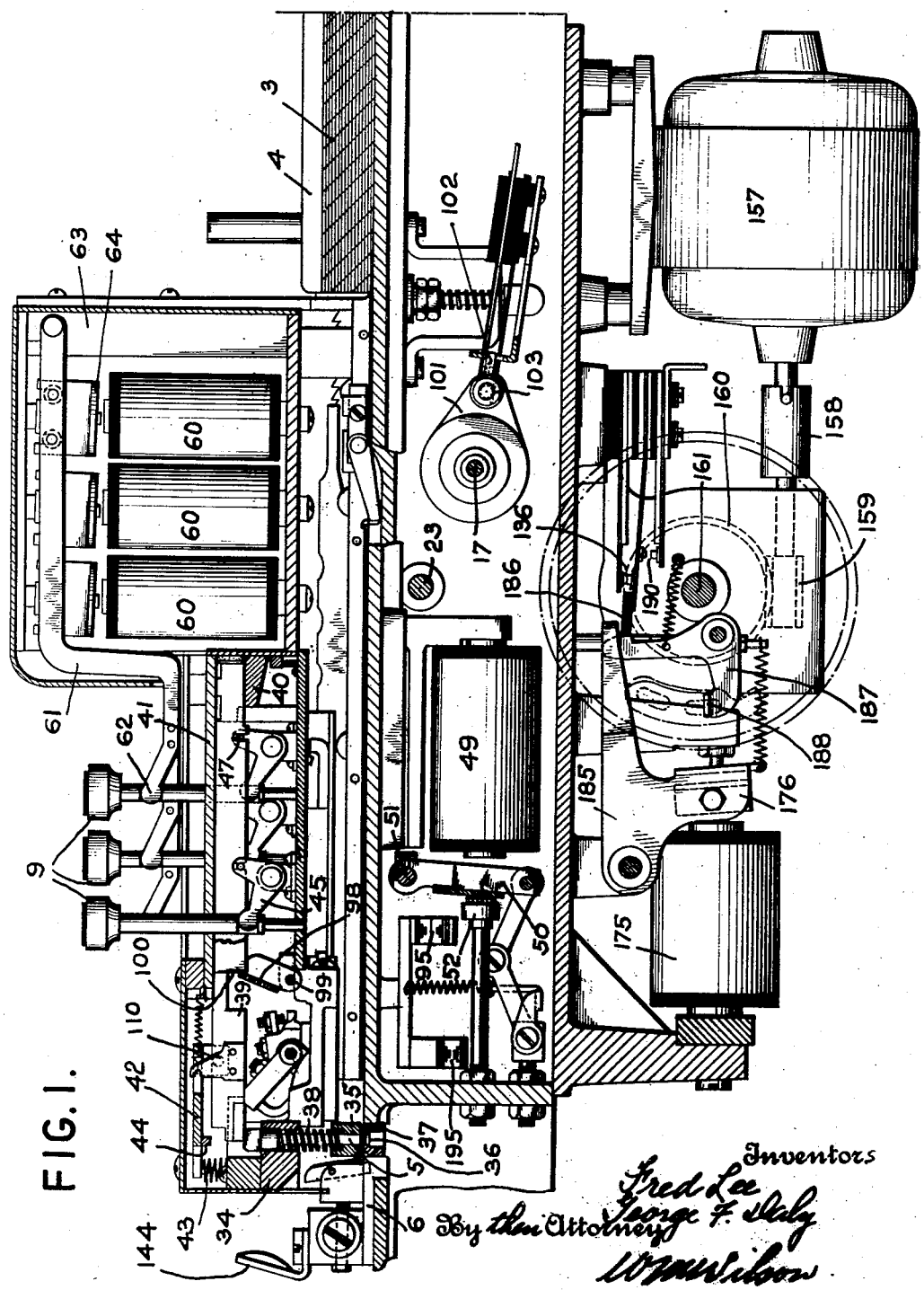

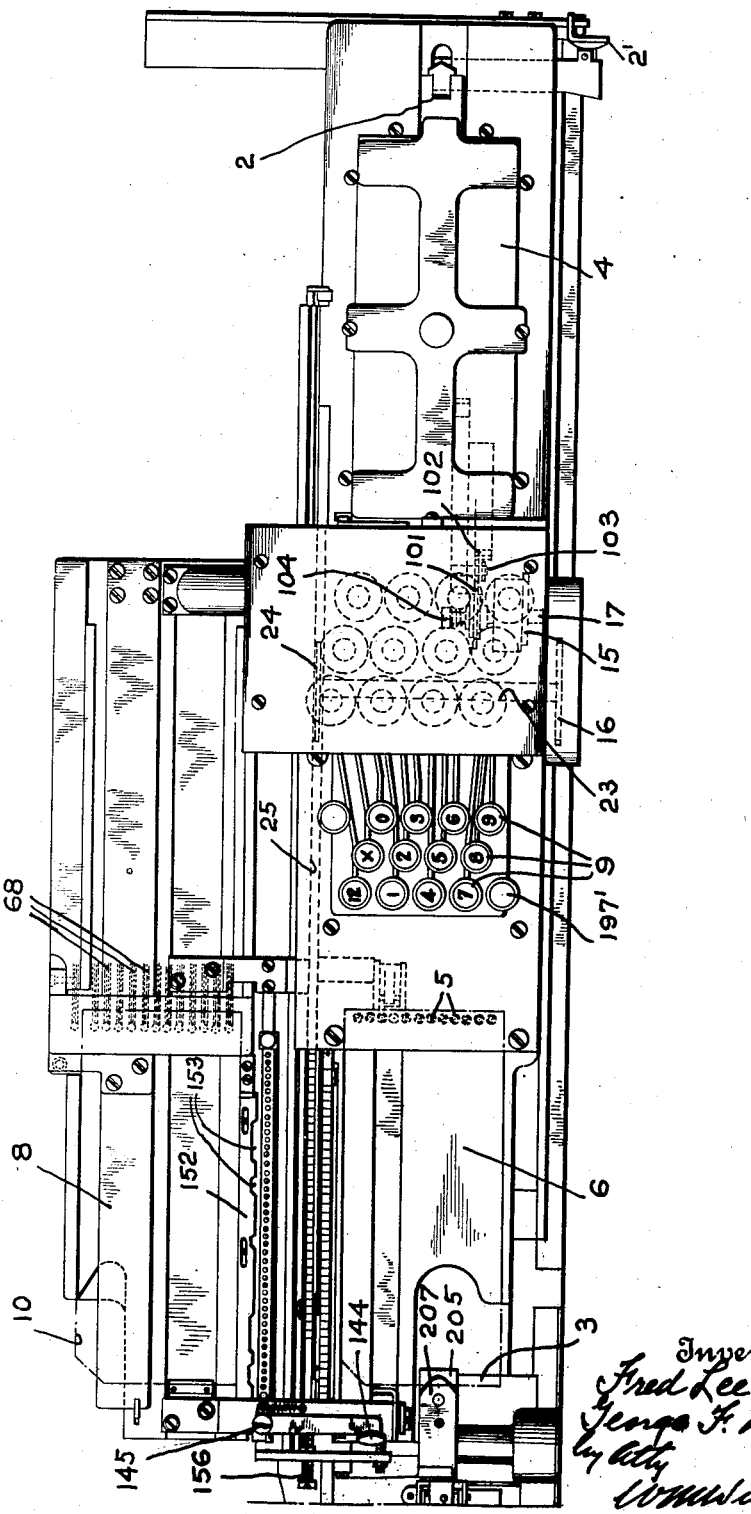

Inventors
Fred Lee
George F. Daly
By their Attorney
W. N. Wilson

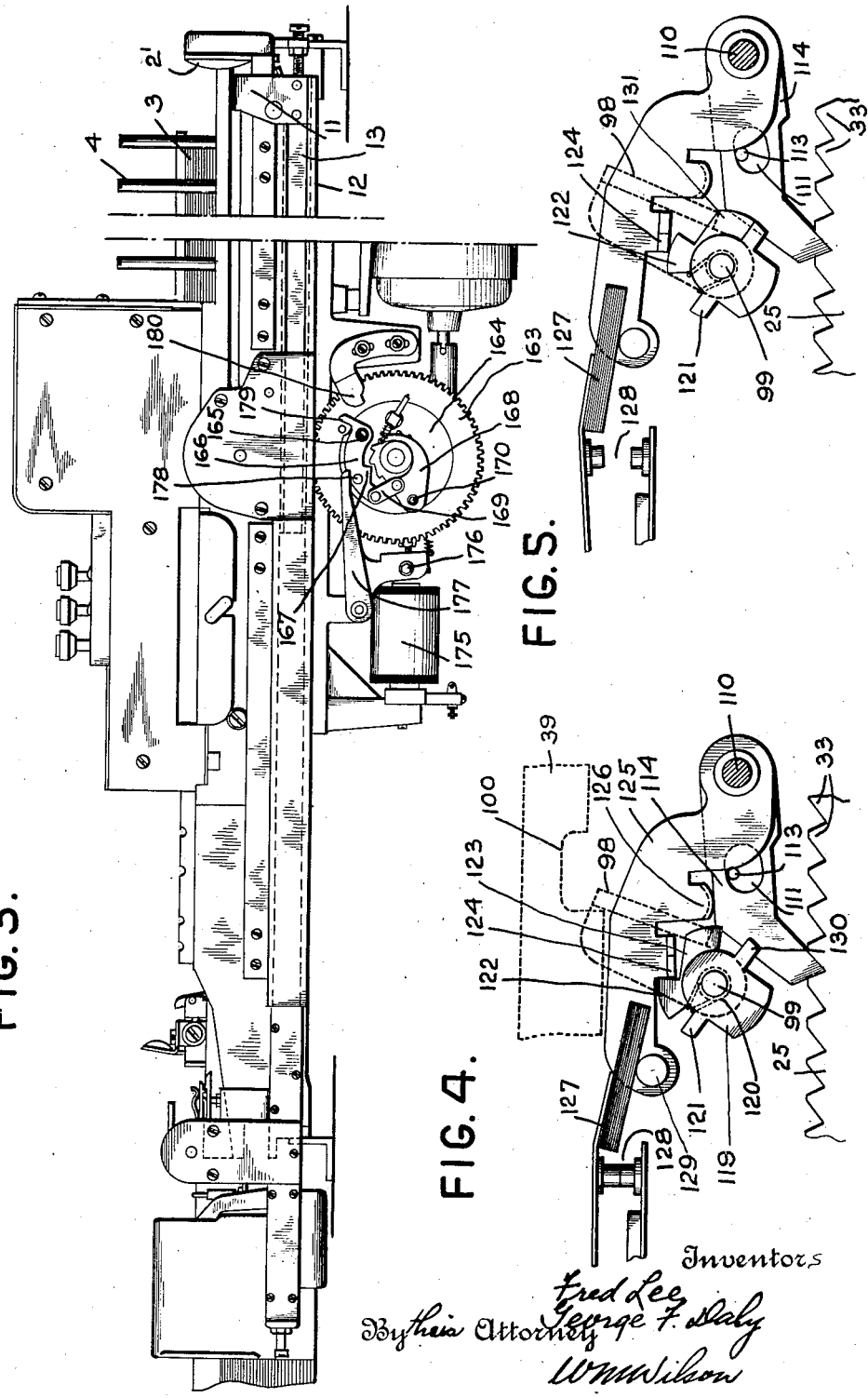

Oct. 9, 1934.    F. LEE ET AL    1,976,618
DUPLICATING MACHINE
Filed Sept. 11, 1929    10 Sheets-Sheet 5
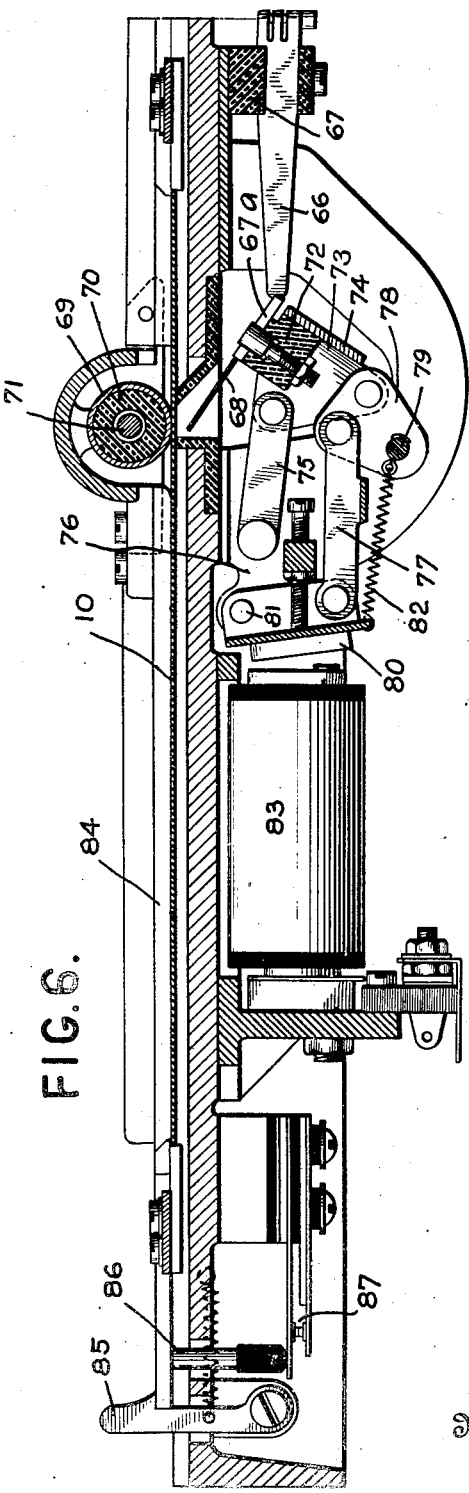
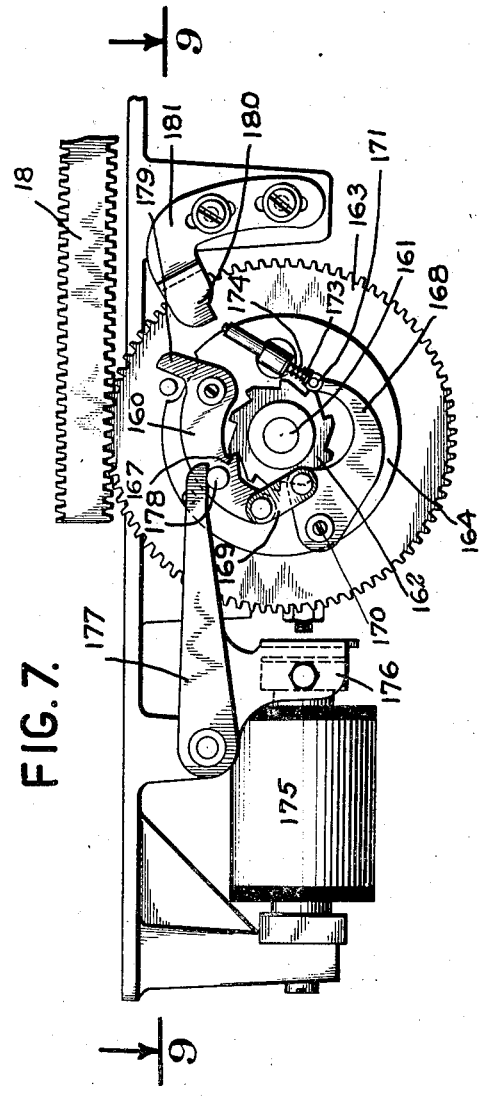

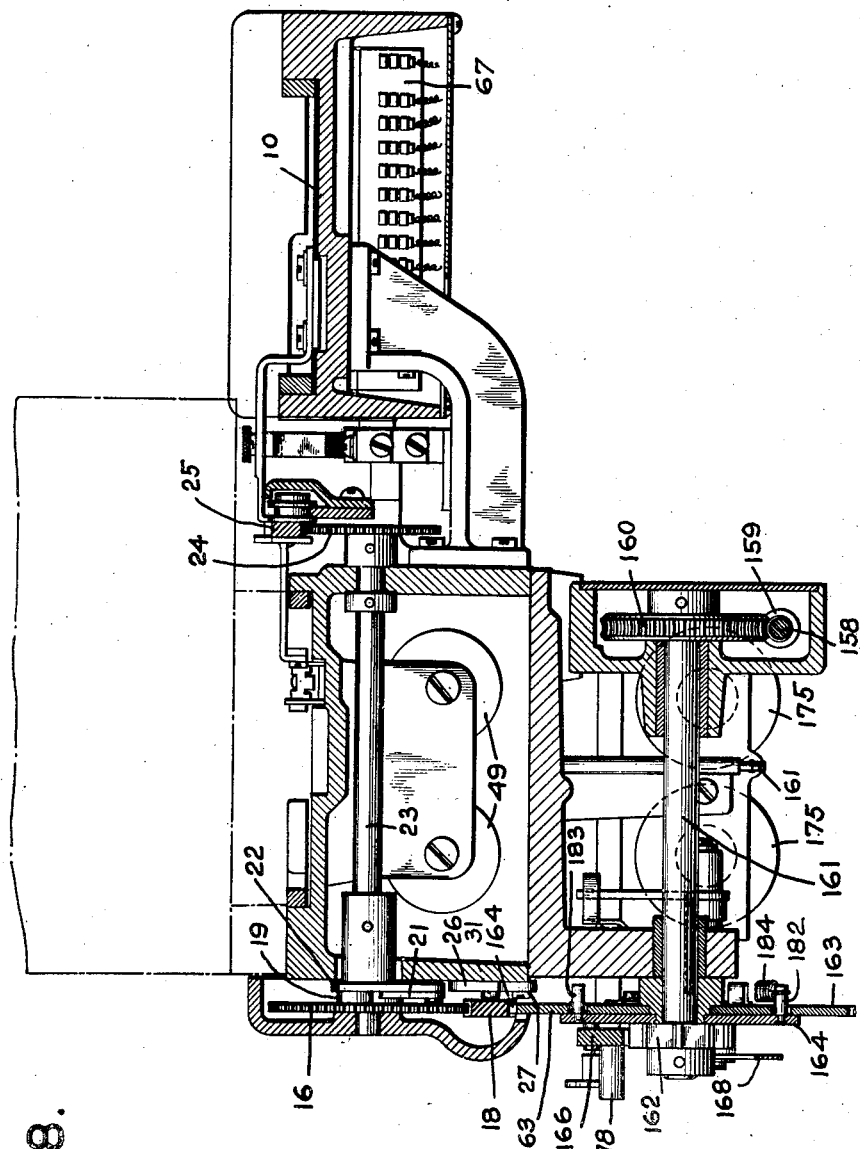

Oct. 9, 1934.    F. LEE ET AL    1,976,618
DUPLICATING MACHINE
Filed Sept. 11, 1929    10 Sheets-Sheet 7

Inventors
Fred Lee
George F. Daly
W. M. Wilson
By their Attorney

Oct. 9, 1934.  F. LEE ET AL  1,976,618
DUPLICATING MACHINE
Filed Sept. 11, 1929   10 Sheets-Sheet 8
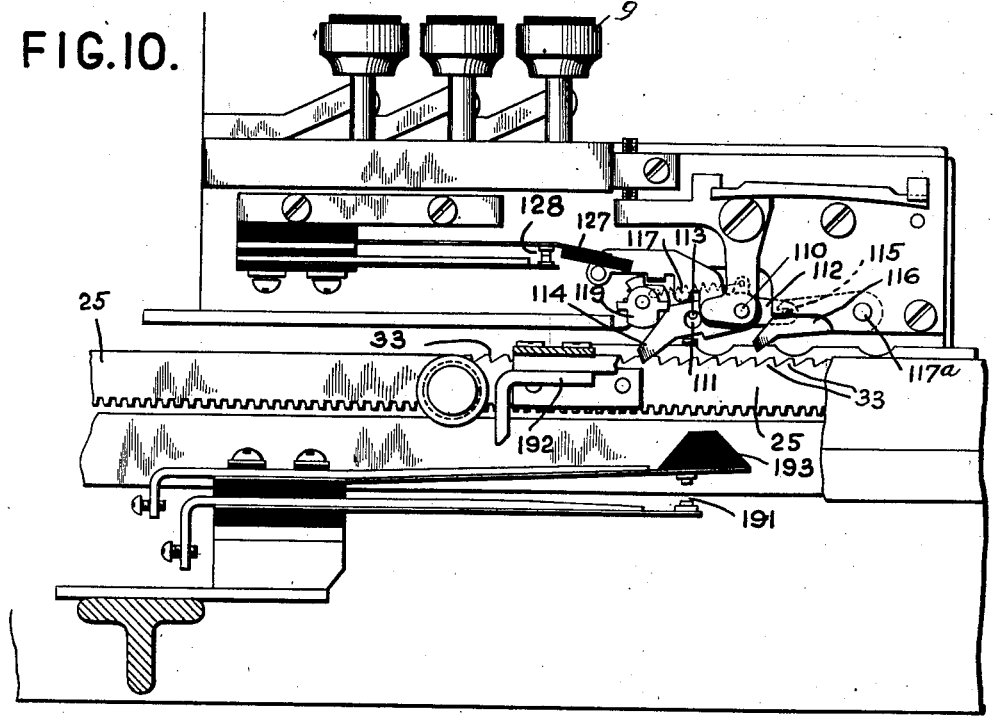
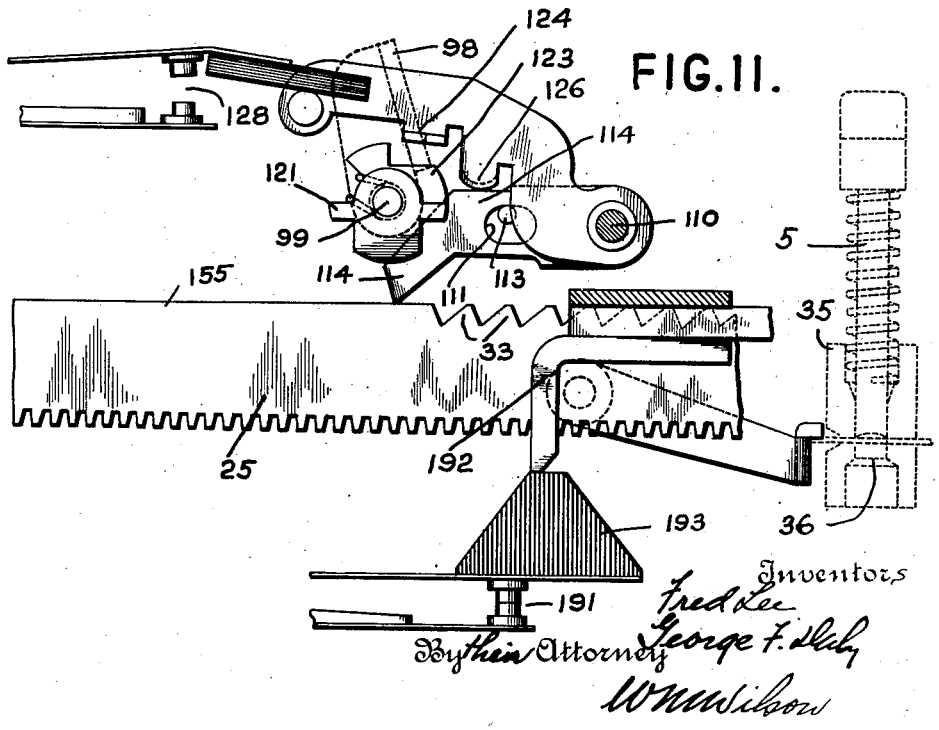

Oct. 9, 1934. F. LEE ET AL 1,976,618
DUPLICATING MACHINE
Filed Sept. 11, 1929 10 Sheets-Sheet 9

Inventors
Fred Lee
George F. Seely
By their Attorney
W. M. Wilson

Oct. 9, 1934.  F. LEE ET AL  1,976,618
DUPLICATING MACHINE
Filed Sept. 11, 1929   10 Sheets-Sheet 10

Patented Oct. 9, 1934

1,976,618

UNITED STATES PATENT OFFICE 1,976,618

DUPLICATING MACHINE

Fred Lee, Binghamton, and George F. Daly, Johnson City, N. Y., assignors, by mesne assignments, to International Business Machines Corporation, New York, N. Y., a corporation of New York Application September 11, 1929, Serial No. 391,874

31 Claims. (Cl. 164—115)

This invention concerns punching machines particularly the duplicating type and has for its general object the provision of certain improvements whereby operations previously performed manually may be accomplished automatically and without attention of the operator.

The main object of the present invention is to incorporate in a punching machine a motor drive for automatically returning the carriages holding the master card and punched card.

It is a further object of the invention to employ in the punching machine a card gripping and ejecting mechanism for automatically removing the punched card and disposing it in a receptacle prior to the automatic return of the carriage.

Certain conditions, however, must be observed prior to the automatic return of the carriage and it is a further object to prevent return of the carriage until the punched card has been ejected and this operation may only be effected when the carriage is in position for punching in the last column. When in such position depression of a special key, or alternately an ordinary punch key, will set into operation the card ejecting mechanism which in turn causes the motor drive to be placed in operation. Such a system of operation, obtained by the present improvements prevents the machine from being operated under improper conditions and qualifies the same for speedier operations.

For analyzing the master card perforations flexible wire brushes are employed and a system of control for the shifting of the brushes by reverse movement of the carriage to prevent damage thereto is also provided for. In the present instance, the control is so arranged that prior to the automatic or manual return of the master card carriage the brushes are shifted to inoperative position although the control is extended so that the so-called column cut-out and the door for maintaining the master card on the carriage may also effect shifting of the brushes for a similar purpose.

It is a still further object of the present invention to provide an improved and simplified carriage return clutch device which lends itself to a manual positioning of the card carriages independent of the manual or power restoring means.

Associated with the escapement devices is a duplicator circuit contact control device having a definite time relation to the contact devices associated with the punch magnet contacts which is provided for the purpose of preventing arcing at the duplicator brushes and prevents operation of a second punch interposer before the operated one has returned to normal position.

A still further object of the present invention is to automatically cut-out the duplicator circuit at the last column card position to permit a second punching operation whereby the supplemental perforation may be employed for identification purposes. This second punching operation, may as premised hereinbefore, cause a subsequent operation of the card ejecting mechanism followed by the power return of the carriages.

A still further object is to provide an improved column cut-out arrangement for automatically breaking the duplicator circuit when the carriage is at column positions necessitating manual punching operations.

With these and incidental objects in view, the invention consists in certain novel features of construction and combination of parts, the essential elements of which are set forth in the appended claims, and a preferred form of embodiment of which is hereinafter described with reference to the drawings which accompany and form part of the specification.

Fig. 1A is a plan view of the illustrative machine embodying the present improvements;

Fig. 1 is a sectional view illustrating details of construction of the punching devices and associated electrical controlling devices;

Fig. 3 is a front view of the illustrative machine;

Figs. 4 and 5 are detail views of part of the carriage escapement and associated contact controlling devices;

Fig. 6 is a sectional view in side elevation illustrating the brush shifting and controlling devices;

Fig. 7 is a view in side elevation of parts associated with the driving mechanism for returning the card carriages;

Fig. 8 is a sectional view taken on the line 8—8 of Fig. 2;

Fig. 10 is an enlarged view illustrating the details of construction of the carriage escapement mechanism and a contact controlling device operable when the carriage is positioned for punching in the last column;

Fig. 11 is a view in side elevation illustrating the manner in which certain contacts are controlled at a certain position of the card carriage;

Figure 2:
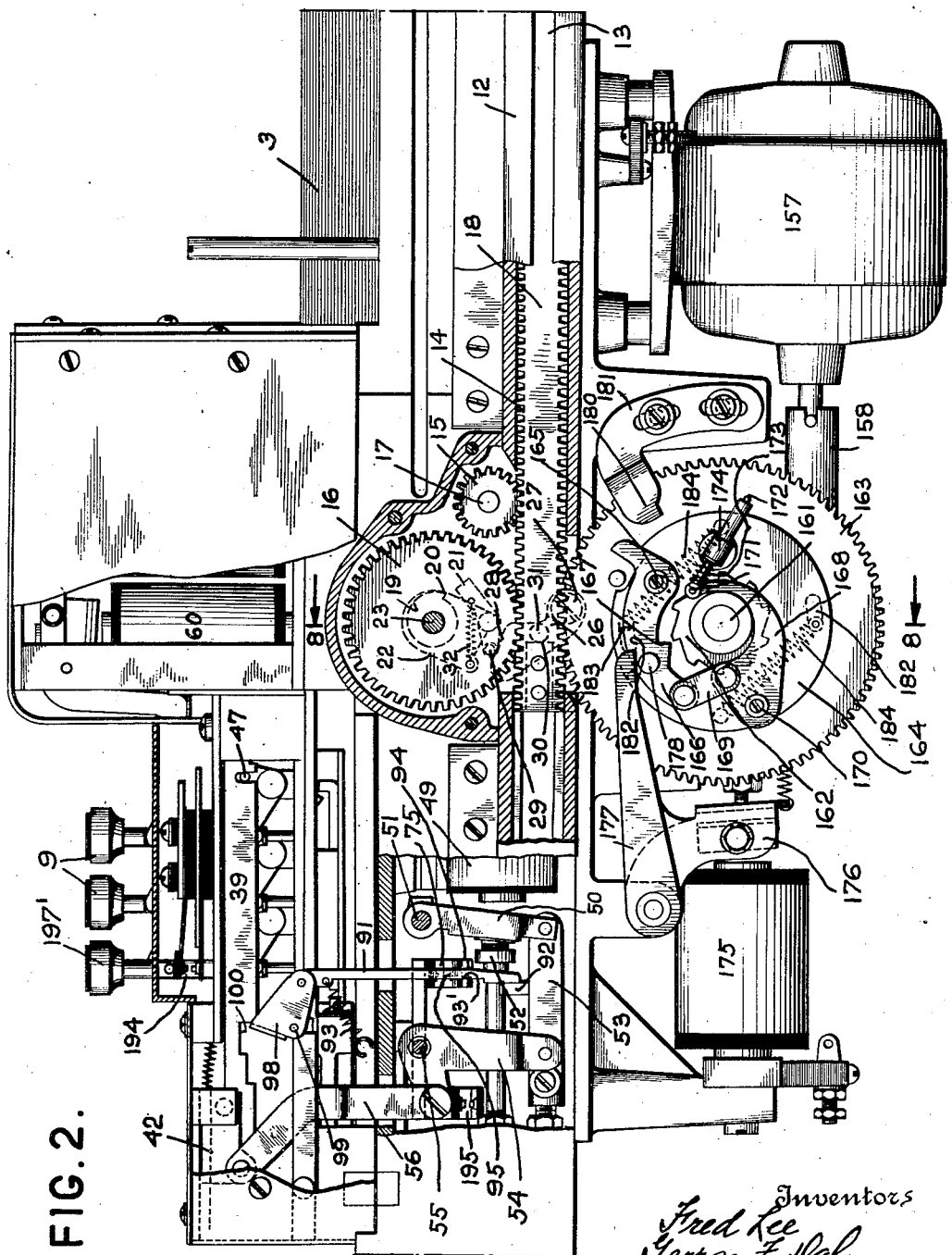
Fig. 2 is a sectional view similar to Fig. 1 but taken on a section line further to the front of the machine.

The machine is arranged for convenient right hand operation by a finger piece or handle 2' (Fig. 1A) having a normal position at the right hand end of the machine and being mounted for leftward movement along the side of the machine. When the handle is moved to the left, in this manner a statistical card 3 is fed from the bottom of the hopper 4 by the usual picker knife 2 and advanced to the left to be operated upon by the punching mechanism comprising punches 5 (Fig. 1).

Such leftward actuation of the handle 2' also serves to move a card carriage 6 (Fig. 1A) to the right to a position to receive the card 3 when the picker reaches the end of its leftward movement. The card is then punched column by column, as required, and the card carriage 6 moves step by step to the left. When the punching of the card is completed and the carriage has reached the end of its movement the punched card according to the present invention is automatically removed and the operation repeated.

The punches 5 may be operated normally by means of numeral keys 9 (Fig. 1) or may be controlled by a duplicator in accordance with the perforations of a pattern member which may be a previously punched card functioning as a master card 10 (Fig. 1A). Such master card is also supported by a carriage 8 and is moved through the duplicator concomitantly with the movement of the blank card 3 through the punching mechanism.

The handle 2' is mounted at its left end on a bracket 11 (Fig. 3) and at the right of the bracket the handle is offset to provide a finger engaging portion. Bracket 11 has a rearward extension having secured thereto a block to which is pivoted the previously mentioned picker adapted to feed cards singly from the bottom of the pack in the hopper 4.

The handle 2' may also be used to actuate the card carriage 6. To this end the bracket 11 is turned to extend through a longitudinal slot in a tube 12 (Fig. 3) and is secured to a rod 13 slidable in said tube. Adjacent the extreme leftward position of the handle 2' the tube 12 is cut away at the top to permit teeth 14 (Fig. 2) of a rack portion 18 of rod 13 to mesh with the teeth of a pinion 15 and a gear 16. The pinion 15 is secured to a shaft 17 on which is mounted the usual coil spring for returning the handle, when released, to its normal position as more fully shown and described in the patent to Lee and Phillips, #1,772,186, dated August 5, 1930. The gear 16 is suitably supported for rotation and is fixed to a member 19 (see also Fig. 8) having a single tooth 20 in the plane of a pawl 21 pivoted to a disk 22 attached to shaft 23. At its other end shaft 23 is provided with a gear 24 fixed thereon and meshing with a tooth in the lower edge of a rack 25 which may be considered as forming part of the card carriage 6.

To control the clutch device 20—21 provision is made of a cam element 26 (Fig. 2) pivoted at 27 and having a cam edge 28 cooperating with a pin 29 secured to a tail of pawl 21. The rack member 18 has secured thereto a block 30 in the plane of a pin 31 secured to cam element 26 whereby the coaction of the end of block 30 with pin 26 at the extreme rightward position of finger piece 2 or carriage 6 will cause cam edge 28 to rock pawl 21 out of engagement with the shoulder of disk 19. In this position of the parts the carriage 6 is freely movable.

When, however, the finger piece 2' is shifted to the left, rack 18 will through block 30 release cam element 26 permitting a spring 32 to rock pawl 21 sufficiently to pass in front of the shoulder 20 which in the meantime has been brought to the necessary position by initial clockwise rotation of gear 16 by teeth 14 of rack 18. It should be observed that a leftward movement of handle 2' will transmit through clutch device 20—21 power to move carriage 6 to the right to receive a card 3 positioned by the picker in the punching mechanism 5.

The top of rack 25, observing Figs. 10 and 11, is also provided with rack teeth 33 inclining towards the left end of the machine which are provided for the purpose of controlling the stepping of the carriage by increments to provide for successively punching the card in the multiple columns. The description of the escapement mechanism referred to will be given in sufficient detail hereinafter to understand its cooperation with certain improvements incorporated therewith. The escapement mechanism just referred to is of the same general nature as that disclosed in the Schaaff Patent No. 1,426,223, granted August 15, 1922 and reference may be had to this patent for further details of construction and operation.

It is sufficient to state at the present time that upon an initiation of the handle 2' to the left the clutch members 20, 21 are shifted into engagement thus connecting gears 16 and 25. The escapement mechanism referred to is adapted to hold the carriage 6 when it has reached its extreme limit of movement and at this time the first column of the card to be punched will lie beneath the row of the punches 5 (Fig. 1) which have enlarged upper ends guided in a member 34 and lower ends extending through openings in a guide or stripper member 35 and immediately above openings 36 in a die plate 37.

The punches 5 are of the general form disclosed in the copending application of Lee and Phillips, Serial No. 34,516, filed June 3, 1925 (now Patent #1,772,186) and are normally held in raised position by springs 38 interposed between the enlarged heads thereof and the stripper member which is provided with openings to receive the lower ends of said springs. Resting on the upper ends of said punches are interposers 39 supported at their rear ends on a cross member 40 and resting against the lower face of an overlying plate 41 so that they prevent further upward movement of said punches. The interposers 39 are so notched at their forward ends that when they are in normal position depression of an actuating plate 42 against a spring 43 will move a portion 44 of the depressor plate 42 into such notches.

However, when any numeral key 9 is depressed it will actuate a bell crank 45 against the action of suitably connected springs. The forward arm of each bell crank has a rounded head fitting into a notch in the shank of the key, the upright end having a pin 47 in a slot in the lower edge of the corresponding interposer 39. Such interposer will then be advanced to such a position that depression of the member 44 will effect depression of the interposer and consequently of the corresponding punch.

Upon movement of any of the interposers 39 a pair of contacts 95 are adapted to be closed thereby closing the circuit to a punch magnet 49 which through intermediate mechanism is adapted to rock the depressor 42 to actuate the selected punch 5. Subsequently the circuit of the magnet 49 will be broken allowing the return of the depressed interposer to normal position.

Upon energization of the punch magnet 49 in this manner the armature 50 will be swung about its pivot 51 away from the abutment or stop 52 and through the link 53 will rock a bell crank 54 about the pivot 55 to draw downward the link 56 and rock the plate or depressor 42.

Subsequently the circuit of the magnet 49 will be broken allowing the return of the depressed interposer to normal position. At this time the escapement mechanism will be effective and the rack 25 and card carriage will advance one tooth to permit punching in the next column of the card.

Across the lower edge of all of the interposers 39 is a bail or universal member 98 pivoted at 99 and reaching into notches 100 in the interposers. Attached to the bail member 98 is a depending arm 91 held against a bracket 92 on link 53 by a spring 93. This spring also tends to pull the arm 91 downwardly rocking the bail 98 clockwise into engagement with the right hand shoulder of the slots 100 in the interposers 39. The arm 91 has a shoulder 93' normally hooked under the contact leaf 94 of the pair of contacts 95. When a key 9 is depressed to move one of the interposers 39 to operative position this interposer rocks the bail 98 counterclockwise raising the arm 91 and causing contacts 95 to be closed. This causes energization of magnet 49 as will be observed in the wiring diagram (Fig. 15) to operate the perforating device. As the punch passes through the card and the link 53 moves to the right the member 92 will push the arm 91 to the right so that the contact leaf 94 will be released and contacts 95 will then open deenergizing the magnet 49 permitting the punch and its actuating mechanism to return to normal positions.

The interposer 39 returns when the key 9 is released and permits bail 98 to turn clockwise to normal position and arm 91 to be lowered so that its shoulder 93' will again snap under leaf 94 and be ready to close the contacts when the next key is depressed. It will be recognized that when the contact leaf 94 is released contacts 95 cannot be closed again until the key 9 which effected their closing has been released and the next key depression effected.

The operation of the punches 5 may also be controlled by means of the duplicator which causes the selector magnets 60 (Fig. 1) to be actuated in accordance with the perforations of a previously punched master card which in the present instance is arranged for punching in forty-five different columns. The selector magnets are twelve in number and operate the ten numeral keys and two auxiliary keys, one being marked "X" and the other being blank, and the latter are arranged to operate the two punches at the end of the row farthest from the operator.

Such operation of the keys controlled by the selector magnets 60 may be effected by means of levers 61 (Fig. 1) having at their ends in one direction rounded heads 62 extending into slots in the shanks of the keys to be controlled thereby and extending in the other direction substantially horizontally into a casing for the selector magnets above the cores of the magnets 60. The levers 61 are pivoted to brackets 63 spaced apart and attached to the main frame. Adjustably attached to each of the levers 61 is an armature 64 for cooperation with the corresponding magnet. Extending from one end of each magnet coil 60 is a wire 65 (Fig. 15) which is connected to a related spring contact plate 66 (Fig. 6) the series of which are carried by a block 67 of insulating material.

Each spring 66 is adapted for a sliding continuous electrical contact with an associated brush holder or block 67a which carries its particular analyzing brush 68. The series of brushes 68, of which there are thirteen, are adapted to bear against a metal cylinder or roller 69 mounted on a non-conducting roller 70 which is carried by a shaft 71. The brushes 68 are carried by an insulating brush holder 72 secured between a pair of side plates 73 of a yoke or bail shaped member designated generally by reference numeral 74. Each side plate 73 of the yoke shaped frame 74 is suspended or supported at its upper end by a link 75 pivoted to the frame portion 76 and at its lower end the plates 73 are supported by means of a parallel link 77. Intermediate each plate 73 and related link 77 is a toggle plate linkage member 78 which is pivoted upon a spring stud 79 securely fastened to the frame member 76. The end of the link 77 distant from its connecting point to the toggle plate 78 is pivotally secured to an armature structure 80, the latter being pivoted at 81 to the frame member 76. The armature structure 80 is attracted against the tension of a spring 82 when a magnet 83 is energized at which time the counterclockwise rocking movement of each toggle plate 78 about its pivotal point 79 will be effective to elevate the frame 74 resulting in the contact of the individual analyzing brushes 78 with the contact roll 79.

Figure 15:
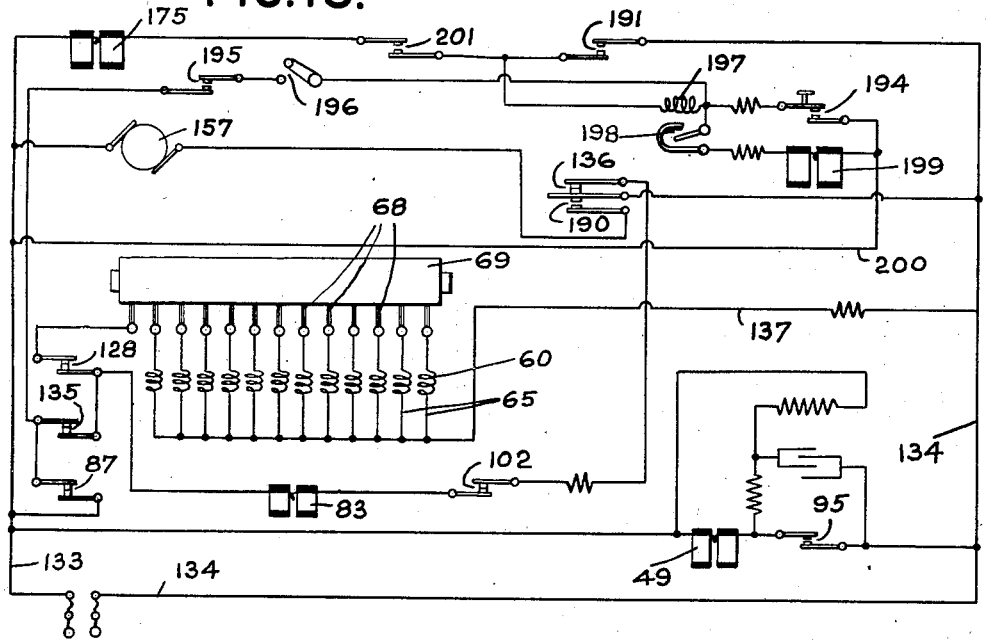
Fig. 15 is a preferred wiring diagram of the electrical parts of the machine.

The brush holder 72 and analyzing brushes 68 extend completely across the duplicator and when a master card 10 is in the duplicator it will pass between the roller 69 and all of the brushes 68 except the one to the left in Fig. 15 and which is in continuous contact with the contact roller 69 when the latter is in lowered position. It will be evident that when there are no perforations in the portion of the master card between the contact roller 69 and the series of brushes 68 none of the selector magnets 60 will be energized. When, however, a perforation in the master card 10 comes into position over one of the analyzing brushes 68 the circuit to one of the selector magnets 60 will be completed and by energization of the corresponding selector magnets 60 the associated punch 5 will be operated.

Associated with the master card table is a resilient plate 84 adapted to be held down by a latch 85 during normal operation. When the latch is released and the plate 84 elevated the master card may be placed upon the master card carriage. Attached to the plate 84 is a contact operating member 86 adapted to engage and close contacts 87 when the plate is latched. Upon elevation of the latter to place a master card on the carriage contacts 87 will open and since they are in series connection with the magnet 83 (see Fig. 15) the latter will be deenergized to cause a shifting of the brush holder 72 to its lowermost position to permit the card to be shifted on top of the master card carriage without danger of damaging or bending the brushes 68.

As a similar interference between the brushes 68 and the perforations of the master card would result as the master card is shifted to its initial punch controlling position by movement of the finger piece from the right to the left certain other mechanism is also provided to lower the brushes during this movement. This improvement forms no part of the present invention and for further details of construction and operation reference may be had to the patent in the name of F. L. Lee, No. 1,878,935, dated September 20, 1932. For an understanding of the present machine as a whole it is sufficient to understand that secured to the shaft 17 is a plate 101 (Figs. 1 and 1A) which when rocked clockwise is adapted to close a pair of contacts 102 through the medium of a pin 103. A suitable friction device 104 (Fig. 1A) is interposed between shaft 17 and the plate 101, details of which are fully shown and described in the aforesaid patent to F. L. Lee. This clockwise rocking movement occurs when rack 18 is shifted to the left coincident with a corresponding movement of the finger piece during which time the master card carriage is shifted to the right. Contacts 102 are in series connection with the brush magnet 83 (see Fig. 15). When the contacts 102 are open the brushes 68 will be lowered. By a reverse movement of shaft 17 which occurs during a movement of the carriage to the left as in punching operations, shaft 17 will be rocked oppositely to cause the brushes 68 to be shifted upwardly into contact with the contact roll 69.

The escapement mechanism just referred to is of the same general nature as that disclosed in the patent to Schaaff No. 1,426,223 granted August 15, 1922 but in order to give a better understanding of the operation of the machine a brief description of the mechanism will now be given.

Shaft 110 (Fig. 10) which is rocked as an incident to each punching or spacing operation has secured at one end oppositely extending arms 111 and 112, of which 111 is provided with a laterally projecting pin 113 for engagement with an enlarged opening in a stepping dog 114 which is loosely pivoted. The opposite arm 112 is provided with a laterally extending pin 115 extending in a slot formed in the locking dog 116 between its pivot 117a and its engaging end.

When the shaft 110 is rocked the arm 111 will through the pin 113 lift the stepping dog 114 out of one of the notches in the rack bar 25 and at the same time the arm 112 will depress the locking dog 116 into a notch between the teeth 33.

At this time a spring 117 advances the loosely pivoted stepping dog 114 a short distance but sufficient to permit this dog to rest upon the top of the next tooth. When the locking dog 116 is again raised out of engagement with the teeth 33 at the upper edge of the rack bar 25 as an incident to the clockwise movement of rod 110 the stepping dog 114, due to the movement of the rack bar 25 will ride down along the tooth on which it rests until the next tooth 33 strikes the end thereof and the said carriage 6 is thereby arrested.

As the shaft 99 upon which universal bail 98 is fixed is rocked from the position shown in Fig. 11 to the position shown in Fig. 4 by a shifting of an interposer 39, a T-shaped element 119 secured to shaft 99 is rocked slightly clockwise.

A spring 120 is coiled about shaft 99 and has its ends abutting a projection 121 of element 119 and a projection 122 of an element 123 loose on shaft 99. The projection 122 (Fig. 4) normally abuts a lug 124 of a contact operating member 125 loose on shaft 110, the result being that spring 120 is coiled about shaft 99 as the element 119 is rocked. When the stepping dog 114 is elevated the upper edge contacting with an arcuate lug 126 of arm 125 will elevate the latter permitting the projection 122 to be urged by the spring 120 to ride under the lug 124. An insulating block 127 of the upper blade of contacts 128 contacting with a pin 129 on arm 125 will result in opening contacts 128. The contacts 128 (see Fig. 15) are in series connection with the last brush 68 of the series and when opened break the duplicator circuit to prevent arcing at the brushes 68.

As the universal bail 98 is returned to its normal position a projection 130 will strike a projection 131 of element 123 to rock the latter clockwise during a return movement of the bail 98 (see Fig. 5). It will also be recalled that when the armature 50 (Fig. 2) was shifted the extension 92 disengaged the notch 93' of arm 91 from lower contact blade 94 so that when bail 98 is in the rocked position (Fig. 5) notch 93' will be positioned above the lower contact blade 94. The arcuate edge of projection 122 is of sufficient length to retain contacts 128 opened until the notch 93' re-engages the lower contact blade 94. This insures that the arm 91 will be in position to close contacts 95 by the subsequent shifting of a selected interposer prior to the closing of the duplicator circuit by closing of contacts 128.

An explanation of the parts just described will be given in connection with the preferred wiring illustrated in the wiring diagram of Fig. 15. Current is supplied to the electrical instrumentalities by line wires 133—134. Contacts 95 are in series with the punch magnet 49 so that when these contacts are closed the magnet 49 will be energized.

Energization of the magnet 83 to shift brushes 68 is dependent upon closure of four sets of contacts, contacts 87 closed when the plate 84 (Fig. 6) is latched, column cutout contacts 135 controlled in a manner hereinafter to be described, contacts 102 governed by shaft 17 which are closed when a master or blank card is shifted in a punch controlling direction and opened when the master card is positioned to its initial punch controlling position, and a set of contacts 136 which in the normal punch operations of the machine are latched closed (see also Fig. 1).

A wire 137 connects the line side 134 to one side of the series of punch controlling magnets 60 each of which is in series connection with a related brush 68 so that the circuit to roller 69 is completed through the master card perforations. One of the brushes 68 has a continuous electrical contact with roller 69 and the circuit from said brush to the line side 133 extends through the contacts 128 just described (Figs. 4 and 5) and the pairs of contacts 135 and 87. The duplicator circuit is closed only when all of the pairs of contacts 128, 135 and 87 are closed.

Figure 14:
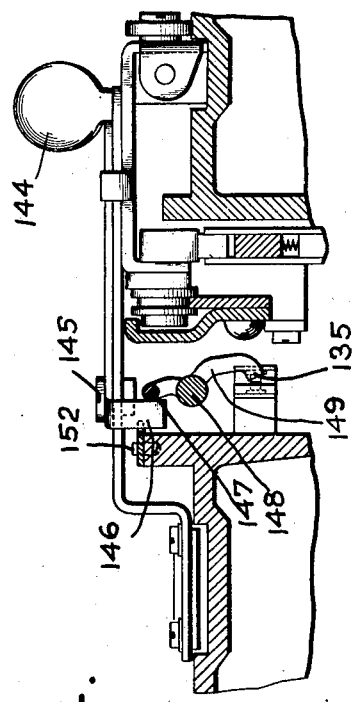
Fig. 14 is a sectional view taken on the line 14—14 of Fig. 12.

It will be recalled that when the carriage is shifted to the right to position the master card the brushes 68 are moved away from the contact roll and if it is desired to move the master card backwardly after it has passed by the analyzing brushes a lever 144 (Figs. 1a and 14) is actuated. This lever is mounted on a pivot 145 at the left end of the carriage 6 and has a downwardly extending lug 146. When the lever 144 is actuated to move the card carriage 6 to the right the lug 146 presses against a bail 147 and rocks a shaft 148 on which the bail is mounted and inasmuch as the shaft and bail extend along the path of the movement of the card carriage the shaft 148 and bail 147 will be held in operated positions as long as the handle 144 is pressed to the right.

Projecting downwardly from the shaft 148 is a finger 149 which upon turning the shaft as described engages an insulating member 150 on a spring 151 and by flexing the spring disengages the contacts 135 thereby opening the brush magnet circuit 83 and the duplicator circuit as well. When the carriage has been positioned at the desired point the lever 144 is released, resulting in the energization of magnet 83 to elevate the brushes and closure of the duplicator circuit.

Figure 13:
Fig. 13 is a detail view of a column escapement bar.

The machine also has provisions for cutting out punching in certain predetermined columns or fields to permit manual punching of the columns or fields cut out. The means for producing this effect may comprise a bar 152 (Figs. 13 and 14) fixed to the base of the machine and which has cut out portions 153 coextensive with the column or field to be duplicated and cam portions 154 adapted to engage the lug 146 of lever 144 to open contacts 135 just as if the lever 144 was actuated to thereby cut out the duplicator for certain columns or fields. The bar 152 may be attached to the machine base in any suitable manner and made up as desired for suppressing the duplicating action.

Provision is also made for cutting out the duplicator when the 45th or last column of the card has been punched. Observing Fig. 11 it will be seen that coincident with punching the last column the stepping dog 114 will rest upon the upper straight edge 155 of rack 25 thereby holding contacts 128 opened even though universal bail 98 is returned to normal. However, a second punching in the last column may also be effected by merely depressing the appropriate key 9, since the carriage is stopped by the usual column stop 156 (Fig. 1A). Several index points of the last column may be appropriated for identification purposes in order that the second perforation may identify the punch operator, a classification or the like.

Provision is also made of means for automatically returning the carriages 6 and 8 to their normal starting position by power instead of manually returning them. Such an arrangement expedites operation of the machine and requires less attention on the part of the operator. The mechanical parts for obtaining this result will now be described followed by a description of the electrical controlling instrumentalities.

Secured to the underside of the base of the machine is a motor 157 (Fig. 1) having a clutch connection to a stub shaft 158 to which is secured a worm wheel 159 (Fig. 8) in mesh with a worm gear 160 secured to a shaft 161 one end of which has secured thereto a ratchet shaped clutch element 162 (see Fig. 2). Loosely mounted on shaft 161 is a gear 163 meshing with teeth on the underside of rack 18 and to which gear is secured a disk 164.

Pivoted at 165 to disk 164 is an arm 166 having a clutch tooth 167. The free end of arm 166 is connected to a toggle plate 168 by a link 169, the end of toggle plate 168 distant from its pivot 170 being articulated at 171 to a rod 172. The rod 172 is urged by a spring 173 and fits in an aperture in a pin 174 rotatably mounted on the disk 164. By virtue of this construction rod 172 and plate 168 act as a toggle, spring 173 acting to impositively hold tooth 167 in or out of engagement with the clutch teeth of ratchet wheel 162.

For the purpose of effecting the clutching action a magnet 175 is provided and when energized attracts an armature 176 so that an arm 177 engaging a pin 178 of arm 166 will rock the tooth 167 into engagement with ratchet wheel 162. Through link 169 the toggle connection will be moved centrifugally (see Fig. 7) spring 173 acting to hold clutch tooth in engagement with the ratchet teeth. Gear 163 will thereupon be driven in a counterclockwise direction substantially a single revolution shifting rack 18 to the left just as if it was caused by movement of finger piece 2. This will, similarly, result in moving carriages 6 and 8 oppositely to their initial punch controlling position.

At the termination of the counterclockwise movement of gear 163 a tail 179 of plate 166 will strike a projection 180 of a fixed plate 181 to effect the disengagement of the tooth 167 and ratchet wheel 162 by a reverse action. The reverse action of the toggle will cause the tooth 167 to be retained out of engagement with the teeth of the ratchet wheel 162 whereupon the coil spring employed to return the handle 2′, fully shown and described in Patent #1,772,186, will act to return the parts to normal position as shown in Figs. 2 and 3. As shown and described in the patent just mentioned, a supplemental coil spring is also provided to shift the carriage intermittently under control of the escapement mechanism as an incident to each card punching operation.

Plate 164 is preferably mounted on gear 163 by pin and slot connections 182 and 183 (Figs. 2 and 8) and connected to each other for driving movement by springs 184. This construction is provided to take up the shocks due to starting from a position of rest and the sudden stopping of the rotation of gear 163.

Figure 9:
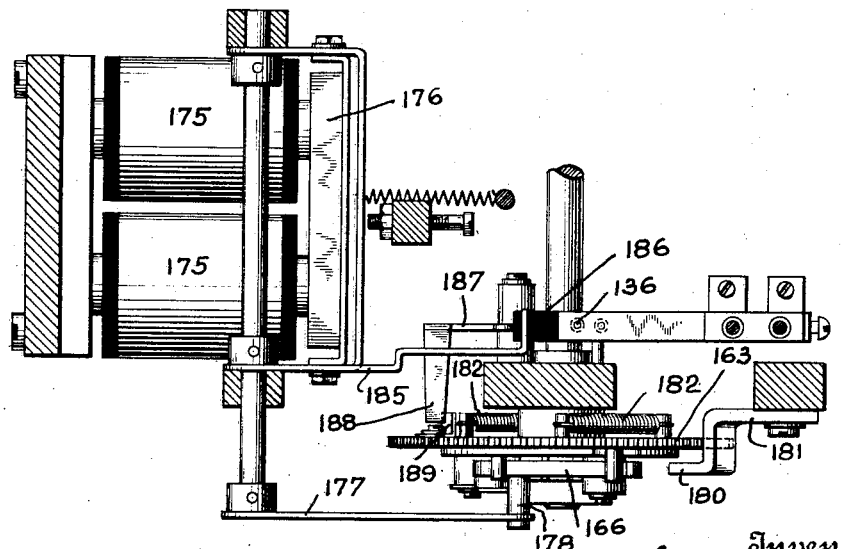
Fig. 9 is a plan view taken on the line 9—9 of Fig. 7.
Figure 12:
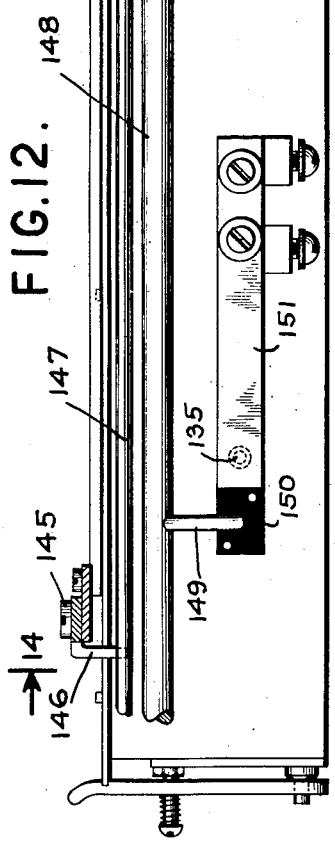
Fig. 12 is a view in side elevation of the mechanism under control of the lever for returning the master card carriage for controlling the contacts which cause shifting of the analyzing brushes.

Also secured to the pivot of armature 176 is an arm 185 (Figs. 1 and 9) the free end of which is adapted to bear upon an insulating block 186 to open contacts 136 when magnet 175 is energized. Contacts 136 are retained opened by a latching bell crank 187 a lug 188 of which is adapted to be struck by a bent up plate 189 (Fig. 9) secured to gear 163 at the termination of the driving movement of the latter. Contacts 136 as indicated in Fig. 15 are interposed in the circuit of brush magnet 83 so as to cause the lowering of brushes 68 during the power restoration of the card carriages but the circuit is closed at the termination thereof to provide for the contact of the brushes 68 with roller 69. Below contacts 136 are motor control contacts 190 which are latched closed upon an energization of magnet 175 to complete the motor circuit (see Fig. 15) and are unlatched to stop the motor at the termination of the driving operation in the manner just described.

For controlling the energization of magnet 175 a relay magnet 197 and related contacts 198 (Fig. 15) are provided and the energization of magnet 197 is dependent upon closure of contacts 191 which contacts are closed when the carriage is in the last column position. At this time a bracket 192 movable with the blank card carriage strikes an insulating block 193 to retain contacts 191 closed (see Fig. 11).

Referring now to the circuit diagram it will be observed that the circuit through magnet 197 may be closed to the other line side 133 by closure of space key controlled contacts 194 or alternately by closure of contacts 195 when a single pole switch 196 is closed.

Contacts 194 are closed manually by depression of a space key 197' (see Fig. 2) so that when a card is punched with either one or two holes in the last column operation of the space key will result in energization of relay magnet 197.

Alternatively, if switch 196 is closed, depression of any punch key 9 to effect a second perforation in the last card column will effect closure of contacts 195 (Fig. 2) since these are closed by one arm of bell crank 54 actuated during each manual depression of a key 9 or duplicating operation.

When the magnet 197 is energized in the manner aforesaid contacts 198 are closed. Closure of said contacts will cause the energization of a magnet 199 which is connected to the line side 133 by a wire 200 and to the other line side through contacts 198, magnet 197, and contacts 191 retained closed by the carriage at the last column position. When magnet 199 is energized certain mechanism will be set in operation to cause contacts 201 to close, and since these contacts are in series with the clutch control magnet 175 the latter will be connected to the other side of the line 134 through contacts 201 and 191. Energization of this magnet will cause power restoration of the carriages in the manner previously described. The manner in which controlling contacts are closed will now be explained.

Means are provided for automatically removing a completely punched card and depositing the same in a receptacle provided for the purpose. This invention is described in detail in the application of J. M. Cunningham, Serial No. 390,755 filed September 6, 1929 to which application recourse may be had for details of construction and operation.

Figure 16:
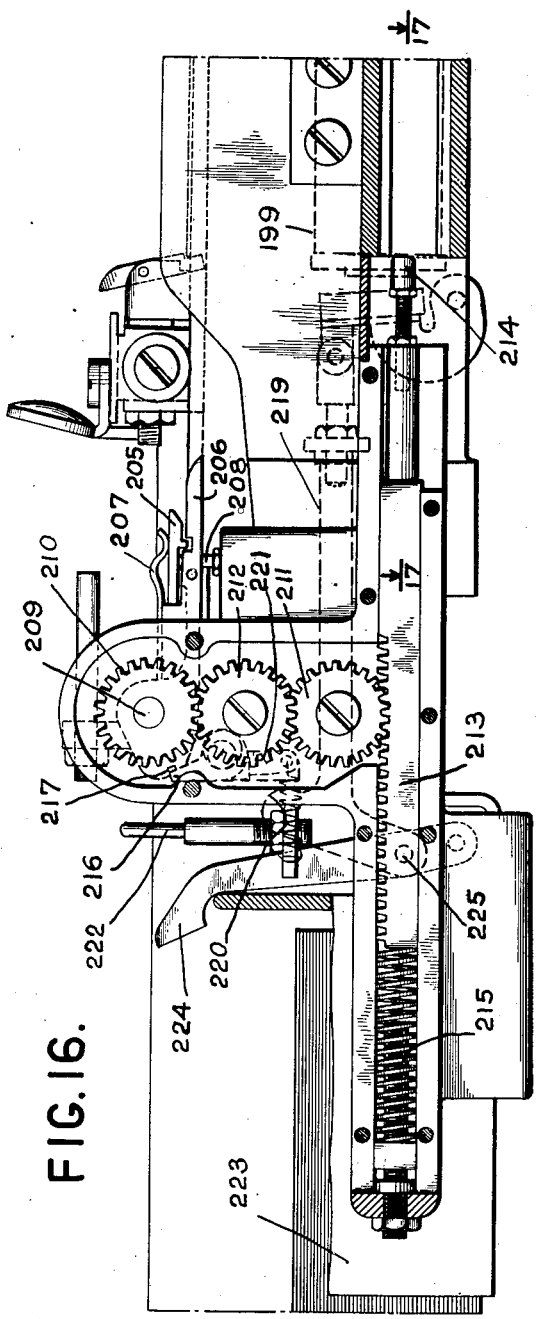
Fig. 16 is a view in side elevation of the card ejecting mechanism.

Stated generally, the gripper comprises (Fig. 16) a pair of jaws 205 and 206 urged together by a flat spring 207 but the abutment of a pin 208 with the upper jaw 205 separates the jaws in order that the punched card may be received by the slit-like separation. The card occupies a position between the jaws at the termination of the punching of the last columns in the card.

The gripper unit is pivotally mounted on a shaft 209 to which is secured a gear 210 adapted to be driven by a gear 211 by an idler gear 212. Meshing with gear 211 is a slidably mounted rack 213 the extremity of which terminates in an adjustable cylindrical plunger 214. During the previous restoration of the carriage the end of rack 18 engaged plunger 214 to shift rack 213 to the left against the tension of a spring 215. This caused a clockwise movement of shaft 209 through the train of gears 210, 211, 212 to bring the gripper unit to the position shown in Fig. 16 whereupon a latch lever 216 will engage a shoulder 217 of the lower jaw 206. At this time a certain amount of compression will be stored up in spring 215.

Shifting of latch 216 is effected by energization of the magnet 199 which attracts its armature when the magnet is energized. This causes a shifting movement of a link 219 to the right and by means of a cam shoulder 220 and arm 221 secured to the pivot shaft of latch lever 216 will shift the latter. This will result in a release of spring 215 to cause the counterclockwise rotation of the gripper unit. As the jaw 205 leaves pin 208 spring 207 will act to cause the latter to close upon the lower jaw 206 thus securely gripping the card and flipping the same in reversed position. A stationary pin 222 may suitably co-act with one of the jaws to separate them permitting the released card to fall in a receptacle 223.

It is preferable, however, to suitably strip the card from the grippers and to this end a pair of strippers 224 are provided. The link 219 is pivotally connected at 225 to one of said strippers so that when magnet 199 is energized the strippers will be shifted to the right. As the jaws rotate to their flipped positions the strippers will project through suitable slots in the grippers in order that the strippers may be positioned behind the card.

Referring to the wiring diagram, magnet 199 it will be recalled is energized when relay 197—198 is closed, and this depends upon closure of the last column contacts 191 and operation of the space key 194, or alternatively, closure of contacts 195 by depression of a second punch key 9 if switch 196 is closed.

Figure 17:
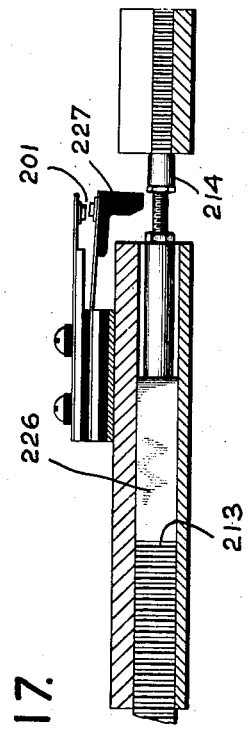
Fig. 17 is a detail view taken on the section line 17—17 of Fig. 16.

When the card just punched is removed from the carriage shifting of rack 213 (Fig. 16) by release of spring 215 will cause a square shoulder 226 (Fig. 17) to engage a block 227 of insulating material to close contacts 201. These contacts, referring to Fig. 15, are in series connection with the clutch trip magnet 175. Thus it will be clear that after the card has been removed from the carriage the motor restoring mechanism will be set into operation to automatically restore the card carriages without attention of the operator.

As the carriage is returned free of the punched card, contacts 191, closed at the last card column position, will now open to cause deenergization of relay magnet 197 and magnet 199. Due to the deenergization of magnet 199 the strippers 224 which have been positioned to the right of the punched card held by the grippers are now shifted by a spring connected to link 219 to strip the card from the released grippers, the latter being thereafter returned to normal latched position by the initial position of the card carriage.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention, it is the intention, therefore, to be limited only as indicated by the scope of the following claims.

What is claimed is as follows:

1. In a punching machine, a set of manually controlled punches, a carriage adapted to carry a card transversely with respect to said punches, means adapted to permit a step by step movement of said card to permit punching in card columns successively and a power driven carriage returning means automatically operable for reversely moving the carriage directly from the position it is in for punching in the last card column and after the removal of the punched card.

2. In a punching machine including a carriage adapted to carry a card transversely with respect to a set of punches for punching in card columns successively, means for permitting a step by step movement of said card, power driven means for reversely moving said carriage directly from its last card column position and after the removal of the punched card, and means whereby said carriage may be retracted from any card column position of the carriage.

3. In a punching machine including a carriage adapted to carry a card transversely with respect to a set of punches for punching in card columns successively, a card ejecting mechanism, and a power driven carriage returning means set in operation by said card ejecting mechanism.

4. In a punching machine including a carriage adapted to carry a card transversely with respect to a set of punches for punching in card columns successively, a card ejecting mechanism, a power driven carriage returning means, and means including a device operable in the position of the carriage for punching in the last card column whereby the card ejecting mechanism and carriage returning means are set in operation automatically and in a predetermined sequence.

5. In a punching machine including a carriage adapted to carry a card transversely with respect to a set of punches for punching in card columns successively, a power driven carriage returning means, a card ejecting mechanism adapted to set said card carriage returning means in operation, the operability of said card ejecting mechanism and carriage returning means being dependent upon the position of said carriage.

6. In a machine of the class described the combination of a card carriage carrying a card adapted to be punched, a power driven carriage returning means, a key adapted to effect manual punching of a card, a card ejecting mechanism, a carriage return control key and means whereby both of said keys under the control of the ejecting mechanism have provisions for setting the card carriage returning means in operation.

7. In a machine of the class described the combination of a card carriage carrying a card adapted to be punched in card columns successively, keys for controlling card punching operations, a card ejecting device and means for holding said carriage in the last column position to permit a supplemental punching in the last column by operation of the selected key to render said card ejecting device effective.

8. In a machine of the class described the combination of a card carriage carrying a card adapted to be punched in card columns successively, keys for controlling card punching operations, a power driven means for returning said carriage, and means whereby operation of the selected key for effecting a supplemental punching operation in the last card column sets said carriage returning means in operation.

9. In a machine of the class described the combination of a carriage carrying a card adapted to be punched, means for permitting a supplemental punching operation in a given card column, and a power driven carriage returning means operable as an incident to a supplemental punching operation.

10. In a machine of the class described the combination of a punching means, means whereby punching operations are effected on a blank card in accordance with master card perforations, a carriage for holding said master card and blank card, means for ejecting only the duplicated card from said carriage while the latter is stationary and a power driven means for automatically returning said carriage from its stationary position.

11. In a machine of the class described the combination of a punching means, means whereby punching operations are effected on a blank card in accordance with master card perforations, a carriage for holding said master card and blank card, a power driven means for automatically returning said carriage, means for automatically removing only the duplicated card from the carriage while the latter is stationary and means for positioning a new blank card on the carriage during the return of said carriage.

12. In a machine of the class described the combination with means for punching a card in card columns successively, of a card carriage, a power driven means for returning said carriage, and means whereby an extra punching operation in the last card column causes the operation of the carriage returning means.

13. In a machine of the class described the combination with a carriage for stepping a card for analyzing operations, of power driven means for returning said carriage, means for causing automatic operation of the power driven means, means comprising brushes for analyzing the card, and means controlled by the means that causes automatic operation of the power driven means for shifting the analyzing means out of contact with said card prior to the return of the carriage from its stepped position.

14. In a punching machine a duplicator comprising a carriage for a master card, a carriage for a blank card, means whereby said carriages are shifted concomitantly for perforating the blank card in accordance with the master card, a power driven means effective for retracting the card carriages after the removal of the perforated card, means for removing the perforated card while its carriage is stationary, and means whereby the carriages may be retracted manually.

15. In a punching machine including punches, a set of manually operated keys for operating said punches, a card carriage arranged to present a work card to said punches for punching in card columns, a power driven carriage returning means, and automatic means under control of the manually operated keys whereby the carriage returning means is set into operation automatically when punching is effected in the last card column but after the removal of the punched card.

16. In a punching machine having a card carriage arranged to present a work card to a set of manually operated punches, a power driven card carriage returning means, a control device arranged to be effective at a certain card column position, and a supplemental control device rendered effective by any manually operated punch and operable conjointly with the first mentioned control device to set the carriage returning means automatically in operation.

17. In a punching machine having a carriage carrying a work card and arranged to present card columns to a set of manually operated punches, a power driven carriage returning means, a control device for the latter controlled by the manually operated punches, and a supplemental control device for the carriage returning means the effectivity of which is dependent upon the position of the card carriage.

18. In a punching machine having flexible wire brushes for analyzing perforations of a pattern card, a card carriage for carrying said pattern card, a power driven card carriage returning means, and automatic means for setting the latter in operation and for preliminarily shifting said brushes out of contact with the pattern card whereby the card carriage may be automatically returned by power without damaging the brushes.

19. In a punching machine having flexible wire brushes for analyzing perforations of a pattern card, a pattern card carriage, power driven card carriage returning means, means for relatively shifting said brushes and pattern card automatically and prior to the operation of the card carriage returning means, and common means for causing the automatic operation of the power driven carriage returning means and said shifting means.

20. In a machine including a carriage adapted to carry a card transversely with respect to a set of devices for operating in card columns of a card, a card ejecting mechanism, and a power driven carriage returning means set in operation by the card ejecting mechanism.

21. In a machine of the class described the combination with a card carriage, of power driven means for automatically returning said carriage, an electromagnet for controlling said power driven means, contacts closed by the positioning of the carriage in the last card column, a card ejecting device, and means whereby operation of the latter and closure of said contacts effects operation of the power driven carriage returning means.

22. In a machine of the class described the combination with a card carriage, of a power driven carriage returning means, devices for controlling said means, a card ejecting mechanism, and means whereby said card ejecting mechanism effects the operation of said devices after the removal of the card from the carriage.

23. The invention set forth according to claim 22 including means for effecting operation of the card ejecting mechanism when the card carriage is in the last column position.

24. In a punching machine, in combination, a duplicator comprising means for analyzing master card perforations and punching a card in columns in accordance with perforations in said master card, an escapement mechanism for controlling the column shift of the card to be punched, means for manually punching said card, and means controlled by an element of said escapement mechanism and operable when the card is positioned for punching in a certain card column for rendering said duplicator ineffective whereby punching in the certain card column may be effected by the manual punching means.

25. In a punching machine, in combination, a duplicator comprising means for analyzing master card perforations and punching a card in columns in accordance with perforations in said master card, means for analyzing the master card perforations, a skip bar having provision of means for rendering said analyzing means ineffective for preventing operation of the punching means under control of said master card perforation analyzing means for certain card columns of the master card, and other means automatically operable when the card is positioned for punching in the last card column for rendering said analyzing means ineffective in the event that said skip bar is ineffective.

26. In a punching machine, in combination, a duplicator comprising means for analyzing master card perforations and punching a card in columns in accordance with perforations in said master card, a skip bar having provision of means for preventing operation of the punching means under control of the analyzing means for certain card columns of the master card, means operable when the card is positioned for punching in a certain card column for rendering said analyzing means ineffective, an escapement mechanism for the card to be punched for controlling the last named means, and means whereby said card may be punched under manual control when said analyzing means is rendered ineffective under control of either the skip bar or said escapement mechanism.

27. In a punching machine, in combination, card punching means and control devices therefor comprising flexible wire brushes for analyzing master card perforations for controlling the punching of a work card, an escapement mechanism for controlling the step-by-step movement of said work card, and means whereby said escapement mechanism controls the effectiveness of said control devices.

28. In a machine of the class described, the combination with means for shifting a carriage in one direction for permitting certain operations on a card while on said carriage, of a card hopper, a power driven carriage returning means, means for ejecting the card from the carriage while the latter is stationary, and means for feeding a blank card in the same direction as the carriage is moved for punching operations and onto the carriage during the return of the latter by said carriage returning means.

29. In a machine of the class described, a carriage carrying a medium adapted to be operated upon past a set of means for operating on the medium, manually controlled means for effecting the operation of the operating means and for controlling the successive stepping of the carriage, power driven means for returning said carriage, means the effectiveness of which is dependent upon the stoppage of said carriage, and means under control of the last named means for causing said carriage to be reversely moved by the power driven means directly from the position it is in when stopped for an operation by said operating means on said medium.

30. In a machine of the class described, a carriage carrying a medium adapted to be operated upon past a set of means for operating on the medium, power driven means for returning the carriage, means the effectiveness of which is dependent upon the stoppage of said carriage, and means under control of the last named means for causing said carriage to be reversely moved by the power driven means directly from the position it is in when stopped for an operation by said operating means on the medium.

31. In a machine of the class described, a carriage adapted to carry a sheet past a set of means for operating on said sheet, manually controlled devices for effecting the operation of said means and for controlling the successive stepping of the carriage, power driven means, mechanism the effectiveness of which is dependent upon the stoppage of the carriage, and means under control of both said manually controlled devices and said mechanism for causing when said mechanism is effective, an automatic return of the carriage by said power driven means.

FRED LEE.
GEORGE F. DALY.